Dec. 18, 1923.
F. E. ANDERSON
1,477,926
MOTOR CONTROL
Filed June 28 1921  2 Sheets-Sheet 2
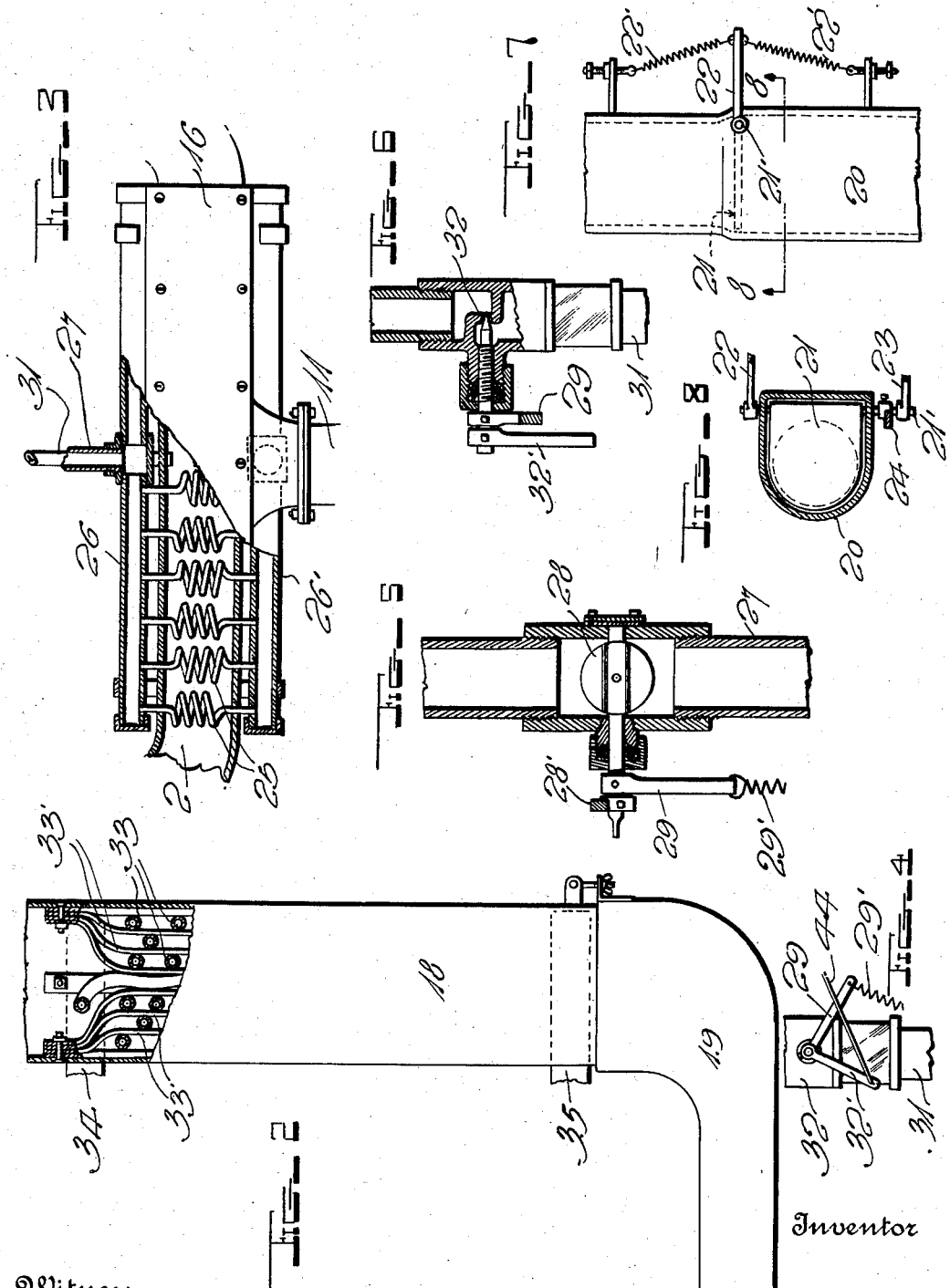
Witness
H. Woodard
Inventor
F. E. Anderson
By H. B. Willson &co.
Attorneys Patented Dec. 18, 1923.

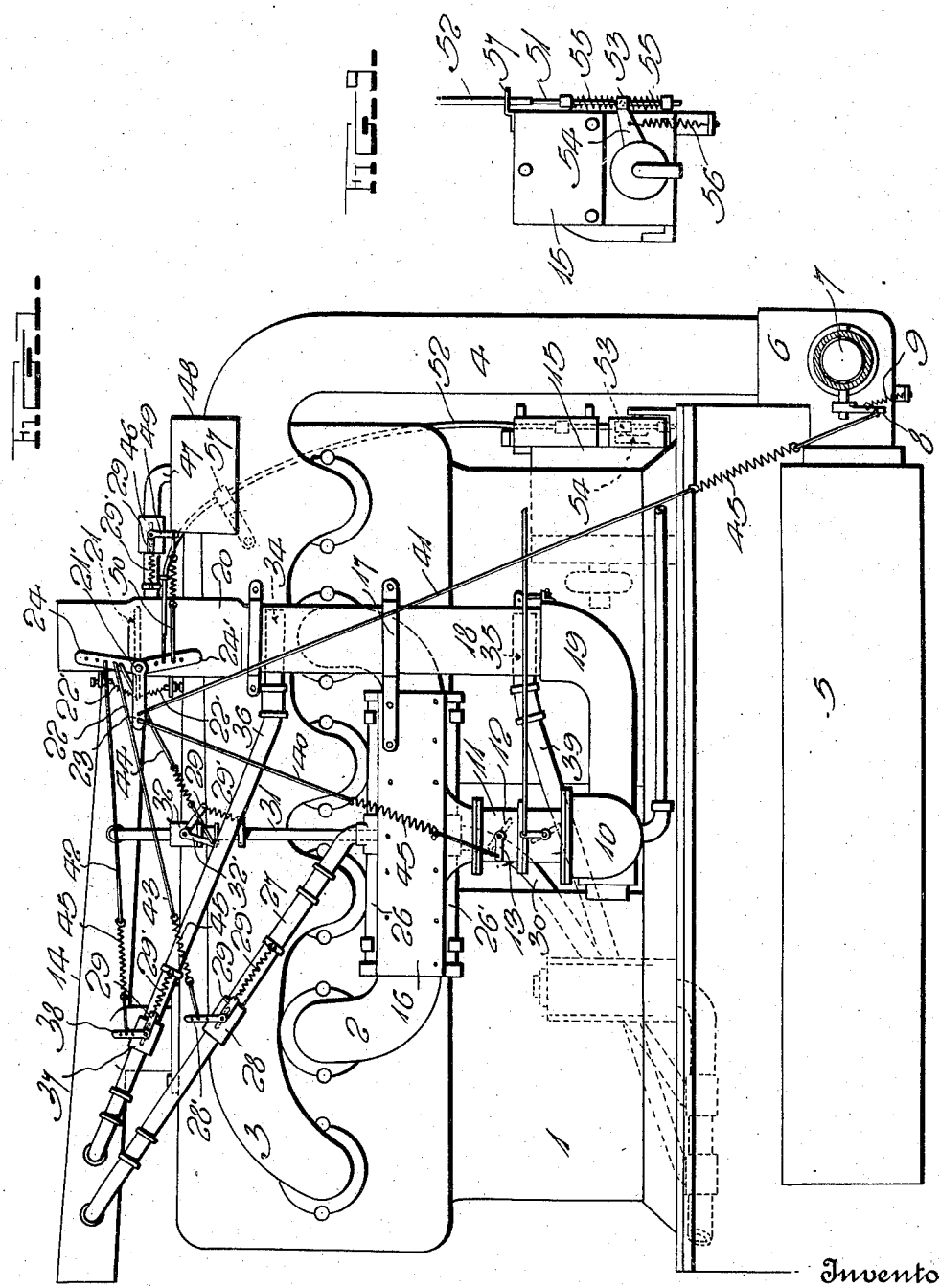

1,477,926

UNITED STATES PATENT OFFICE.

FRED E. ANDERSON, OF OSAGE CITY, KANSAS.

MOTOR CONTROL.

Application filed June 28, 1921. Serial No. 481,091.

*To all whom it may concern:*

Be it known that I, FRED E. ANDERSON, a citizen of the United States, residing at Osage City, in the county of Osage and State of Kansas, have invented certain new and useful Improvements in Motor Controls; and I do declare the following to be a full, clear, and exact description of the invention, such as will enable others skilled in the art to which it appertains to make and use the same.

This invention relates to an improved control mechanism for an internal combustion engine and more particularly to an engine used for tractors which has a governor controlling the speed and is supposed to run at a certain speed regardless of load and where the load varies from no load to overload.

In order to get the best results from an engine under these conditions there are certain conditions to be met and certain mechanical mechanisms to be manipulated at the right time.

The object of my invention is to meet these conditions and to make an engine more serviceable and efficient, to reduce carbon to a minimum, to vaporize the fuel more thoroughly and to get more power out of the fuel.

In order to obtain these and the following results I place a valve in the intake pipe held in a closed position by a spring and which is acted upon by suction of the engine and thereby the different valves and levers are operated.

First. In order to vaporize the fuel more thoroughly it should be under partial vacuum while being mixed in the carburetor and on its way to the cylinders.

This I have accomplished by placing the above valve in the intake pipe so as to let the air strike it before it enters the heater. It can be set so as to create more or less vacuum to suit operating conditions.

Second. It has been demonstrated that an engine will deliver more power on a cool intake charge than on a pre-heated charge and that it is better to have a pre-heated charge for light and idling loads. I have accomplished this by placing a stove on the exhaust manifold with a suitable pipe leading from said stove to the intake pipe and means for reducing the flow through said pipe as the load increases, by placing between said valve and the carburetor a special heater shown in my co-pending application filed June 28, 1921, Serial No. 481090, which receives its heat either from the circulating water or the exhaust gases from the engine with suitable pipe connections and is provided with a valve held open by a spring and with means for closing said valve as the load increases; and by using a special manifold shown in my co-pending application filed June 28, 1921, Serial No. 481090, which receives its heat either from the circulating water or the exhaust gases of the engine and has a suitable valve controlling the amount of heat admitted to said manifold, said valve being held open by a spring and suitable means for closing said valve as the load increases.

Third. In order to obtain the best results from an engine it should be kept as free from carbon as possible. This I have accomplished by feeding water to the intake mixture which is automatically controlled and varies from no water at light load to as much as desired and the amount increases with the load.

Fourth. The spark should be in an advance position for light loads and be retarded as the load is increased. These results I have also obtained by suitable connections with the above controlling valve.

Fifth. At heavy loads the cut-out to the muffler should be open. This I have accomplished by a suitable connection to the above controlling valve and can be set to open as the load increases at any desired point.

Sixth. In some cases, such as running a grain separator, it is very desirable to run an engine as fast or faster under heavy loads as at light loads. This I have accomplished by a suitable connection to the above mentioned controlling valve and to the valve controlled by the governor and by a careful adjustment of said connections the desired results of running the engine as fast under heavy loads as light loads can be obtained.

Another object of the invention is to so construct this control that all of the valves controlled by the controlling mechanism will be properly adjusted simply by increasing or decreasing the load of the motor.

This invention is illustrated in the accompanying drawings, wherein:

Figure 1 is a side elevation showing a motor provided with the improved control mechanism.

Figure 2 is an enlarged view showing the air heater principally in side elevation and partially in vertical section.

Figure 3 is an enlarged view of the intake manifold shown partially in side elevation and partially in longitudinal section.

Figure 4 is an enlarged side elevation of one of the valves.

Figure 5 is a vertical sectional view through one of the valves.

Figure 6 is a view showing the control valve of the water pipe in section.

Figure 7 is a view showing the upper end portion of the air inlet pipe in side elevation.

Figure 8 is a transverse sectional view taken along the line 8—8 of Fig. 7.

Figure 9 is a view showing the distributor in elevation.

The motor indicated in general by the numeral 1 is provided with an inlet manifold 2 and exhaust manifold 3 from which extends an exhaust pipe 4 connected with the muffler 5 by means of a coupling 6. This coupling 6 is provided with the usual cutout valve 7 which may be opened when it is desired to permit the gases to pass out of the exhaust pipe 4 without passing through the muffler. This cutout valve is provided with the usual actuating handle 8 engaged by a spring 9 so that the valve 7 will normally remain closed. The motor is also provided with the usual carbureter 10 from which extends pipe 11 having a valve 12 mounted therein and controlled by the usual governor and provided with an actuating handle 13 by means of a special connector. The motor is further provided with the usual water manifold 14 and with a conventional construction of distributor 15. The intake manifold is of a special construction set forth in my co-pending application and is provided with a removable plate or wall 16 upon which is secured a clamp 17 which is secured about and supports a heater 18. This heater 18 is connected with the air inlet of the carbureter by means of a neck 19. The upper end of the heater 18 carries a valve housing 20 in which is mounted a valve 21, the valve 21 having its stem 21′ extending through the sides of the valve housing 20 and provided at one end with a lever handle 22 engaged by springs 22′ so that the valve will be normally held in a closed position. Levers 23, 24 and 24′ are mounted upon the opposite end of the valve stem 21′ for a purpose to be hereinafter brought out.

Heating coils 25 are placed in the manifold 2 and have their end portions in the form of pipe extensions which pass through the manifold and are connected with manifold tubes 26 and 26′, the manifold tube 26 having connection with a pipe 27 which leads from the water manifold 14 and is provided with a control valve 28. This valve 28 is of the butterfly type and is provided with a stem which carries an actuating handle 28′. The manifold tube 26′ communicates with a pipe 30 which connects with the water circulating pipe adjacent the pump thereof. The intake manifold is further provided at its upper portion with an opening to receive the pipe 31 which leads from the water manifold 14 and is provided with a valve 32. This valve 32 is of the needle variety and provided with a stem having an actuating handle 32′. The needle valve stem is provided with relatively coarse threads so that a short move of the lever 32′ will serve to open or close the valve the desired amount.

The heater 18 is also provided with heating coils 33 which are held in spaced relation by spacing strips 33′ and have their upper and lower ends provided with pipe extensions which extend through the sides of the heater and are connected with manifold tubes 34 and 35. The manifold tube 34 communicates with a feed pipe 36 which communicates with the water manifold 14 and is provided with a butterfly valve 37 upon the stem of which is mounted an actuating lever handle 38. A pipe 39 leads from the manifold tube 35 and connects with the water circulating pipe adjacent the pump and also adjacent the connection of the pipe 30 with this water pipe. Each of the valves 28, 32, 37 and 46 is provided with a lever 29 engaged by a spring 29′ so that it will be yieldably held in a normal position.

As previously stated, it is desired to adjust the various valves and in order to do so, there have been provided wires 40 and 41 which are connected with the arm 23 and with the actuating handles 13 and 8, rods 42, 43 and 44 which are connected with the arm 24 and with the actuating handles of the valves for the pipes 36, 27 and 31. Each of the rods has been provided with a spring section 45 so that the wires will be tightly stretched but at the same time permitted to have sufficient give when necessary. It will thus be seen that when the rods are moved, movement will be imparted to the valve but bending of the rods will be prevented, due to the provision of the springs. In addition to controlling the valves mentioned, it is also desired to adjust the valve 46 of the pipe 47 which leads from the valve housing 20 to the heater 48 mounted upon the exhaust manifold 3. This valve 46 is provided with an actuating handle 49 engaged by a rod 50 which leads from the actuating arm 24′. A wire 51 leads from this arm 24′ through a suitable conduit 52 and has its free end portion passing through a block 53 which is swivelled to the control arm 54 of the distributor. Springs 55 are mounted upon this wire 51 above and below the block 53 and engage abutments so that the wire will be prevented from being bent when moved to adjust the distributor. The usual spring 56 is provided to retain the distributor in the normal position and guides 57 are provided for the conduit so that the conduit and wire will be retained in the proper position.

With the motor provided with this controlling mechanism, it will be assumed that the motor is running idle, in which case, the valves of the pipes 36, 27 and 47 will be open, the valve of pipe 31 closed, the valve 21 closed, and the valve of the pipe 11 almost closed, the muffler cutout closed and the spark advanced. In this condition, the water from the water manifold 14 will pass through the heating coils 25 and 33 so that the air and gas will be heated to a relatively high temperature. Since the valve 21 is closed, the air will pass through the heater 48 and through the pipe 47 into the valve housing 20 and from the valve housing 20 will pass through the heater 18 and through the neck 19 into the carbureter. The air will thus be heated before it enters the carbureter to a relatively high temperature, due to the fact that it first passes through the heater 48 and then passes slowly through the heater 18. After leaving the carburetor, the combustible mixture will pass slowly through the heated intake manifold from which it will pass into the cylinders of the motor. When the load of the motor is increased, it is desired to have the temperature of the air and gas reduced and it will be readily seen that when the suction increases, the valve 21 will be drawn to an open position. The arms 23, 24, and 24' will be moved and as these arms move, the valves of the water pipes 27 and 36 will be partially or almost closed so that the flow of heated water to the heating coils is decreased. At the same time, the valve of the pipe 11 will be moved by the governor toward an open position so that the combustible mixture can pass readily through this pipe and pass rapidly through the intake manifold. The valve of the pipe 47 will also be moved to a closed position so that the air will be prevented from passing through this pipe and all of the air must be drawn in through the valve 20 which has been opened. The temperature of the air will thus be decreased due to the fact that cool air is drawn into the valve 20 instead of heated air from the heater 48 and further due to the fact that the air passes rapidly through the heater 18, the coils of which are heated to a less extent by the reducing of the flow of hot water through the coils thereof. The combustible mixture or gas which passes through the pipe 11 will be relatively cool and since this gas passes rapidly through the intake manifold the coils of which are heated to a less extent due to cutting off of the water supply and it will thus be seen that a relatively cool gas will be supplied to the intake manifold. By properly adjusting the springs 45 of the wires 40 and 41, the valve 12 can be caused to open the proper amount and further the muffler cutout can be caused to open at the proper point so that when the motor is pulling a heavy load, the muffler cutout will be automatically opened. It will be further noted that when the arm 24' moves, a pull will be exerted upon the wire 52 and the distributor will be adjusted to retard the spark. It will also be noted that when this arm 24 moves, the valve of the pipe 30 will be opened and water will be allowed to drip through this pipe into the manifold so that the water will mix with the gas and a moist gas be fed to the motor. It will thus be seen that with this control mechanism, the valves will be opened and closed in proper timed relation to the load of the motor and the temperature of the air and gas increased or decreased, the feeding of water into the gas passing through the intake manifold controlled, the muffler cutout opened or closed, and the spark advanced or retarded.

While I show the motor control operating on the water or oil in the circulating system of the engine exhaust gases can be used but I show the water because I prefer it as I believe it is better for this purpose.

One advantage of using the cooling fluid is that it helps to keep the fluid cool thereby requiring less radiating surface in the radiator.

The valve in pipe 11 is operated by a governor which is on the other side of the motor and controls the speed of the engine.

I claim:

1. The combination with a motor, of an air feeding heating attachment for the carbureter, an inwardly opening valve for the air heater, a gas heating intake manifold, heating coils for the air heater and gas heating intake manifold pipes connecting the coils with the water manifold of the motor and provided with normally open valves, and connections between the valves of the water pipes and air heater whereby the supply of heating water to the coils may be cut off when the load of the motor increases and the valve of the air heater moves inwardly to admit cool air to the air heater.

2. The combination with a motor including an exhaust manifold, and carbureter, of an air feeding and heating attachment for the carbureter, an inwardly opening valve controlling admission of air to the air heater and having an extended stem, arms carried by the extended stem, a heater carried by the exhaust manifold of the motor, a hot air pipe connecting last mentioned heater with the first mentioned air heater and having a normally open valve, a gas heating intake manifold, heating coils in the gas heating manifold and air feeding and heating attachment, water pipes connecting the coils with the water manifold of a motor and provided with normally open valves, and connections between the arms and valves for shutting off the supply of hot water to the coils and closing the valve of the air pipe when the load of the motor increases.

3. The structure of claim 2, having a valve between the carbureter and gas heating manifold, an additional arm carried by the stem of the valve for the air heater, and a connection between said valve and last mentioned arm carried by the stem of the valve for the air heater for opening the valve between the carbureter and gas heating intake manifold when the load of the motor increases.

4. The structure of claim 2 having the motor provided with a muffler cutout, a valve between the carbureter and intake manifold, an additional arm carried by the stem of the valve for the air heater, a connection between the last mentioned arm of the valve stem and valve between the carbureter and intake manifold and a connection between the last mentioned arm of the valve stem and the muffler cutout whereby the muffler cutout and valve between the carbureter and intake manifold may be opened when the load of the motor is increased.

5. The structure of claim 2 having the motor provided with a muffler cutout and a distributor, a valve between the carbureter and intake manifold, an additional arm carried by the stem of the valve for the air heater, a connection between the last mentioned arm of the valve stem and valve between the carbureter and intake manifold, a connection between the last mentioned arm of the valve stem and the muffler cutout whereby the muffler cutout and valve between the carbureter and intake manifold may be opened when the load of the motor is increased, and a connection between the distributor and one of the first mentioned arms carried by the stem of the valve for the air heater to retard the spark when the load of the motor is increased.

6. The combination with an internal combustion engine having a water circulating system, a carbureter and an air intake pipe of a suction operated controlling valve held in a closed position by a spring, an air heater placed between said air intake pipe and carbureter, a pipe leading from said water circulating system to said heater having a valve regulating the amount of heated water admitted to said heater, and suitable connections between the above mentioned controlling valve and last mentioned valve causing the latter to close when the former is opened by the suction of the engine.

7. The combination with an internal combustion engine having an exhaust pipe, a fluid circulating cooling system and an intake manifold provided with heating coils, of a suction operated controlling valve yieldably held in a closed position by a spring and opened by the suction of the engine according to the load of the engine, the heating coils of the manifold being connected to the cooling system of the engine by a pipe provided with a valve for regulating the amount of heat admitted to said heating coils, and suitable connections connecting the valve of said pipe with the suction operated controlling valve so as to admit heating water to the heating coils according to the load of the engine.

In testimony whereof I have hereunto set my hand.

FRED E. ANDERSON.